(12) United States Patent
Baudin et al.

(10) Patent No.: US 11,786,968 B2
(45) Date of Patent: Oct. 17, 2023

(54) METHOD FOR MANUFACTURING A SINTERED BODY

(71) Applicant: SECO TOOLS AB, Fagersta (SE)

(72) Inventors: Micael Baudin, Uppsala (SE); Jan Gravningsbraten, Angelsberg (SE)

(73) Assignee: SECO TOOLS AB, Fagersta (SE)

( * ) Notice: Subject to any disclaimer, the term of this patent is extended or adjusted under 35 U.S.C. 154(b) by 79 days.

(21) Appl. No.: 17/053,337

(22) PCT Filed: Apr. 26, 2019

(86) PCT No.: PCT/EP2019/060783
§ 371 (c)(1),
(2) Date: Nov. 5, 2020

(87) PCT Pub. No.: WO2019/214972
PCT Pub. Date: Nov. 14, 2019

(65) Prior Publication Data
US 2021/0229175 A1 Jul. 29, 2021

(30) Foreign Application Priority Data
May 8, 2018 (EP) .................................... 18171300

(51) Int. Cl.
*B22F 3/24* (2006.01)
*B22F 3/10* (2006.01)
(Continued)

(52) U.S. Cl.
CPC .................. *B22F 3/24* (2013.01); *B22F 3/10* (2013.01); *B22F 3/225* (2013.01); *B22F 5/00* (2013.01);
(Continued)

(58) Field of Classification Search
CPC ......... B22F 2003/245; B22F 2003/247; B22F 3/24; B22F 3/10; B22F 3/1035;
(Continued)

(56) References Cited

U.S. PATENT DOCUMENTS 6,214,523 B1 4/2001 Kapogiannis et al.
2012/0028031 A1* 2/2012 Yamaguchi ............. C22C 38/04
428/319.1
(Continued)

FOREIGN PATENT DOCUMENTS

EP 0402946 A1 12/1990
EP 1510590 A2 3/2005
(Continued)

*Primary Examiner* — Sally A Merkling
*Assistant Examiner* — Dean Mazzola
(74) *Attorney, Agent, or Firm* — Corinne R. Gorski

(57) ABSTRACT

A method for manufacturing a sintered body having one or more hard constituents in a metallic binder phase, the method including the steps of forming a green body from a powder composition including at least the one or more hard constituents, the metallic binder phase, and an organic binder system, forming a pattern in a surface of the green body such as to provide a tag enabling individual identification of the green body, and sintering the green body with the tag to form a sintered body having a smaller volume than the green body. The pattern is formed such that the tag is readable after the sintering operation.

7 Claims, 6 Drawing Sheets

(51) Int. Cl.
*B22F 5/00* (2006.01)
*B41M 5/26* (2006.01)
*B23K 26/362* (2014.01)
*B22F 3/22* (2006.01)

(52) U.S. Cl.
CPC ........... *B23K 26/362* (2013.01); *B41M 5/262* (2013.01); *B22F 2003/245* (2013.01); *B22F 2005/001* (2013.01); *B22F 2301/15* (2013.01); *B22F 2302/10* (2013.01)

(58) Field of Classification Search
CPC ...... B22F 3/225; B22F 5/00; B22F 2005/001; B22F 2301/15; B22F 2302/10; B23B 2260/104; B23C 2210/66; B23D 2277/64; B41M 5/26; B41M 5/262; B41M 5/265; B23K 26/36; B23K 26/362
See application file for complete search history.

(56) References Cited

U.S. PATENT DOCUMENTS

| | | |
|---|---|---|
| 2013/0167447 A1 | 7/2013 | Webb et al. |
| 2014/0195031 A1 | 7/2014 | Couse et al. |
| 2020/0147728 A1* | 5/2020 | Terai ................. B23K 26/355 |

FOREIGN PATENT DOCUMENTS

| | | | | |
|---|---|---|---|---|
| JP | 2001322022 A | 11/2001 | | |
| WO | 2010096003 A1 | 8/2010 | | |
| WO | WO-2019017256 A1 * | 1/2019 | ................ | B22F 1/00 |

\* cited by examiner

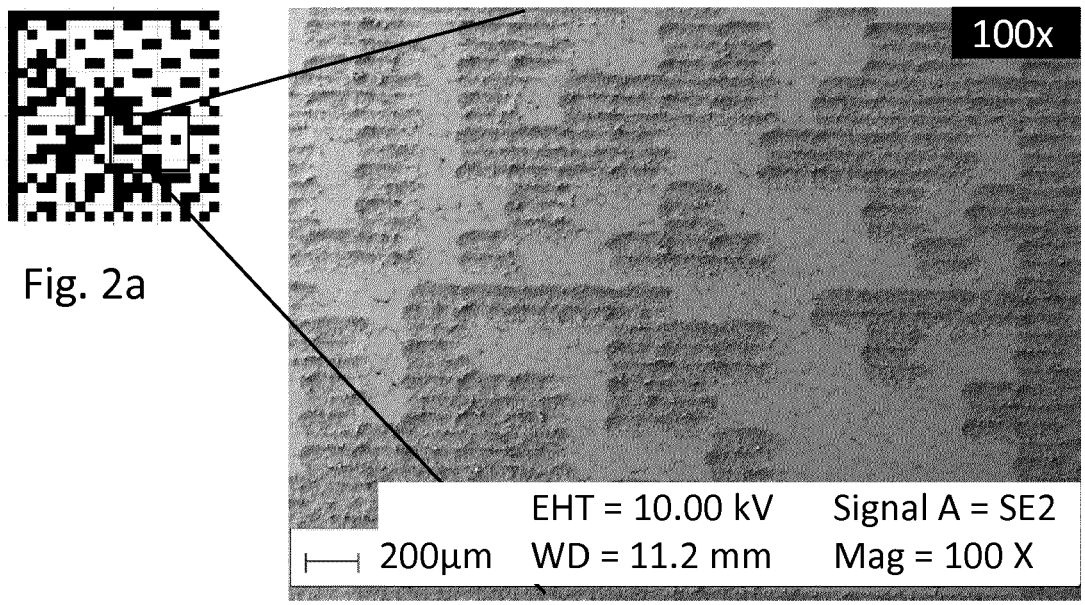
Fig. 2a
Fig. 2b
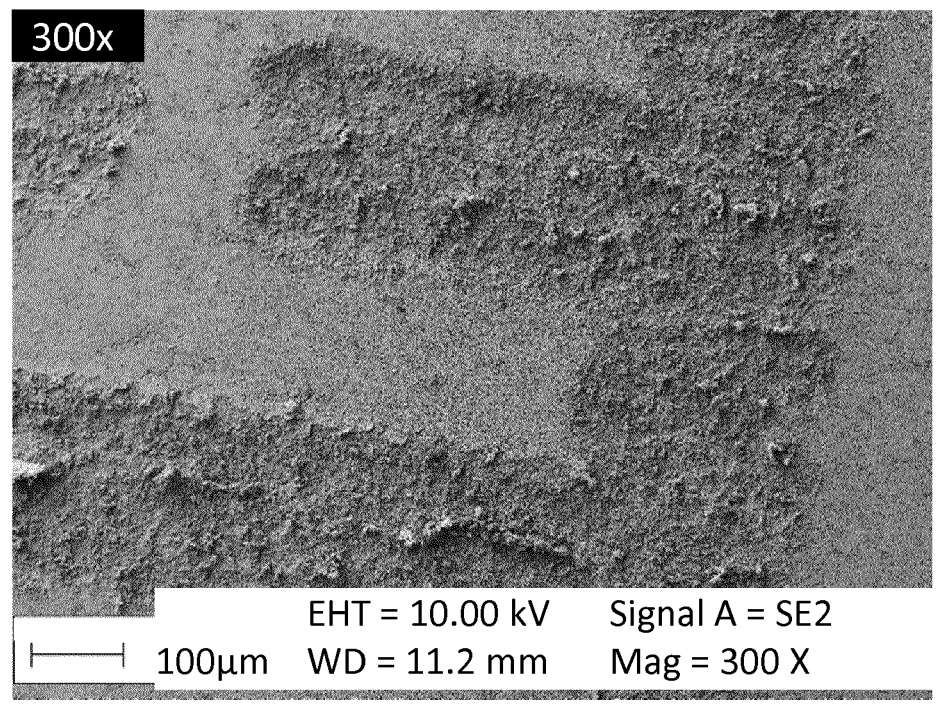
Fig. 2c

METHOD FOR MANUFACTURING A SINTERED BODY

RELATED APPLICATION DATA

This application is a § 371 National Stage Application of PCT International Application No. PCT/EP2019/060783 filed Apr. 26, 2019 claiming priority to EP 18171300.9 filed May 8, 2018.

TECHNICAL FIELD OF THE INVENTION

The present invention relates to a method for manufacturing a sintered body. It further relates to a green body for forming a sintered body and to a sintered body.

BACKGROUND OF THE INVENTION AND PRIOR ART

Cutting tools, such as cutting inserts or tool heads intended for chip removing machining of metal workpieces, are conventionally manufactured by pressing a composite powder into a green body by means of uniaxial or multiaxial pressing, followed by sintering of the green body to obtain a sintered body. Alternatively, a green body may be formed by means of e.g. powder injection moulding (PIM), additive manufacturing, or extrusion. The green body is thereafter sintered and the sintered body may be subjected to various post-sintering processing operations, such as grinding and coating. In the sintering process, the green body shrinks with a length shrinkage which is typically about 15-20%, corresponding to a volume shrinkage of about 40-50%. A debinding step for removing at least part of the organic binder is usually performed before the sintering step, and/or by successively increasing the temperature to the sintering temperature.

Green bodies are typically produced in large batches. The batch size may vary considerably for different processing steps and green bodies from the same batch may therefore typically be regrouped together with green bodies from other batches prior to sintering and post-sintering processing. The final sintered bodies, or cutting tools, of one batch may therefore originate from different batches of green bodies.

In the final steps of post-sintering processing, the cutting tools may be provided with a readable tag configured to allow individual identification of the cutting tools during the life cycle of the cutting tool. The benefits of individual marking are numerous and include e.g. individual traceability of the cutting tool and the possibility to individually log information about usage, cutting data etc.

SUMMARY OF THE INVENTION

It is desirable to provide a method for manufacturing a sintered body by means of which the traceability of the sintered body is in at least some aspect further improved. It is also desirable to provide a sintered body with an in at least some aspect improved traceability.

To better address this concern, according to a first aspect of the invention, a method for manufacturing a sintered body comprising one or more hard constituents in a metallic binder phase is provided. Particular embodiments are defined herein.

The proposed method comprises:

forming a green body from a powder composition comprising at least the one or more hard constituents, the metallic binder phase, and an organic binder system, forming a pattern in a surface of the green body such as to provide a tag enabling individual identification of the green body, sintering the green body with the tag to form a sintered body having a smaller volume than the green body, wherein the pattern is formed such that the tag is readable after the sintering operation.

By providing the tag on the surface of the green body in such a way that the tag is readable both prior to sintering and after sintering, the traceability of the green body and the subsequently formed corresponding sintered body can be significantly improved. For example, the individual green bodies/sintered bodies become traceable in the entire production line. By means of a central data collection system configured to read and write data from production steps included in the method of manufacturing the sintered body, information relating to manufacturing conditions can be logged for each individual body by reading the tag and storing information relating to e.g. temperature, date, time, production equipment, etc., in a database. Also, information about the material composition of the powder used for manufacturing the green body can be stored. This information is useful when the used cutting insert is to be recycled.

Moreover, information relating to usage of the sintered body, e.g. cutting conditions in the case of a cutting insert for a cutting tool, can be logged individually. Cutting data used in a machining operation using the cutting insert can in this way be coupled to the individual cutting insert. Also recommendations relating to cutting conditions may be stored in the database. An operator of a machining operation using the cutting insert can thereby gain access to recommended cutting conditions by reading the tag.

The information stored in the database can be accessed at a later time, for example for quality control. Since each individual green/sintered body can be followed through the entire production process and through the subsequent usage cycle, every deviation from preset specifications can be traced back in a relatively straightforward manner. The information in the database can also be used to adjust parameters of a specific production step depending on the stored information from previous production steps.

Individualised information from the database may also be used for quality improvements, since the information makes it possible to better understand quality variations arising within large batches of sintered bodies, e.g. during chemical vapour deposition (CVD) coating of up to 10,000 individual sintered bodies per batch. The individualised information makes it possible to tailor the parameters of the CVD coating process to narrow the variations.

The pattern constituting the tag is formed such that it survives the sintering process and the shrinkage occurring during sintering, i.e. a length shrinkage of about 15-20%, corresponding to a volume shrinkage of about 40-50%.

By the tag being readable is to be understood that the tag may be read using e.g. a scanning equipment, such that the sintered body or green body may be identified upon reading the tag.

The sintered body comprises one or more hard constituents in a metallic binder phase, such as a cermet, a cubic boron nitride or a cemented carbide material. The hard constituent may be tungsten carbide (WC), or another metal carbide with the general composition (Ti, Nb, Ta, W)C, or combinations thereof. The hard constituents may also include metal carbonitrides such as Ti(C, N). The metallic binder phase may be Co, Ni or Fe, or combinations thereof, wherein Co is preferred.

Prior to the sintering operation, and/or as a part of the sintering operation, the method may comprise removing the organic binder system from the green body. This is commonly referred to as debinding and may be achieved e.g. in a catalytic process, by extraction in a suitable solvent, and/or by heating at a temperature lower than the sintering temperature. Debinding may e.g. be carried out at least in part in connection with the sintering operation by successively increasing the temperature.

According to one embodiment, forming the pattern comprises using a laser to selectively modify the surface of the green body. It has been found that by selectively modifying the surface using a laser, a pattern may be formed that survives the sintering process and the shrinkage associated therewith. A possible alternative to laser marking may be to form the pattern by mechanically impressing the pattern into the surface of the green body.

According to one embodiment, selectively modifying the surface comprises selectively burning off the organic binder system, thereby forming indentations in the surface. The modified surface with the burnt-off organic binder system provides contrast such that the tag is readable both before and after sintering, and also subsequent to a possible coating process using CVD or physical vapour deposition (PVD). The contrast may in most cases be attributed to the difference in surface height, wherein the indentations may appear darker or lighter than the unmodified surface as the tag is read.

According to one embodiment, the tag is in the form of a data matrix code. A data matrix code is a two-dimensional bar code which may be in the form of a square or rectangular symbol made up of individual modules of predetermined size in the form of dots or squares. The individual modules form an ordered grid of contrasting (e.g. dark or light) modules, bordered by a finder pattern used to specify the orientation and structure of the symbol. The tag can in this case be used to store information about a very large amount of individual sintered bodies, depending on the size of the data matrix code. The size may typically be 12×12, or larger depending on needs. In an error correction algorithm, several damaged or blurred modules can be corrected for.

According to one embodiment, the tag comprises a plurality of first type modules and second type modules of equal module size, each first type module being in level with the surface of the green body surrounding the tag, and each second type module comprising an indentation with respect to said surface, wherein forming the pattern comprises selectively forming the indentations. For example, a laser may be used to form the indentations as discussed above. The tag may in this embodiment preferably be a data matrix code.

According to one embodiment, forming the pattern comprises adapting an intended size of the indentations such that, after sintering of the green body, a contrast is achieved between neighbouring first type and second type modules. The contrast should be sufficient for reading using a scanning equipment with a certain sensitivity. This could be achieved e.g. by providing indentations that are of a sufficient depth.

According to one embodiment, adapting the intended size comprises setting the intended size to a smaller value than the module size. This has proved to be an efficient way of compensating for shrinkage occurring during sintering, such that the tag survives the sintering process and is readable before as well as after sintering. If using a laser to selectively modify the surface, the laser may be programmed such that it modifies an area within each module which is smaller than the actual module size, e.g. by leaving an unmodified frame around the modified area.

According to one embodiment, the method further comprises post-sintering processing of the sintered body, wherein the pattern is formed such that the tag is readable after the post-sintering processing. Post-sintering processing may e.g. include one or more of the following: coating the sintered body using CVD and/or PVD, grinding of cutting edges, shot peening, blasting and brushing.

According to one embodiment, the method further comprises storing and retrieving data relating to the manufacturing of the sintered body in a central database. As previously mentioned, this may be processing parameters used during the production steps included in the method of manufacturing. For example, information relating to the sintering process and to post-sintering processing may be stored in the central database. By identifying a sintered body or a green body and retrieving data related to the particular body from the central database, the body may be categorised prior to a production step such that suitable processing parameters are selected depending on previous processing of the body.

According to another aspect of the invention, a green body for forming a sintered body comprising one or more hard constituents in a metallic binder phase is provided, wherein the green body is formed from a powder composition comprising at least the one or more hard constituents, the metallic binder phase, and an organic binder system, wherein a surface of the green body is provided with a pattern forming a tag, which tag enables individual identification of the green body. Advantages and advantageous features of such a green body appear from the above described method.

According to another aspect of the invention, a sintered body formed by sintering the proposed green body is provided, wherein the tag formed on the green body is readable on the sintered body and enables individual identification of the sintered body. The sintered body may be manufactured by means of the proposed method according to any one of the described embodiments.

According to one embodiment, the sintered body comprises a coating. This may e.g. be a PVD or a CVD coating.

According to one embodiment, the sintered body is a cutting tool or a part of a cutting tool, wherein the cutting tool is configured for chip removing machining. Cutting tools may herein be understood as indexable cutting inserts for milling-, turning- and drilling applications, solid drills or solid end mills. The sintered body is in this case preferably provided with a PVD and/or a CVD coating.

Further advantages and advantageous features of the proposed invention will appear from the following detailed description.

BRIEF DESCRIPTION OF THE DRAWINGS

Embodiments of the invention will in the following be described by means of example with reference to the appended drawings, in which:

FIG. 2a shows an example of a data matrix code, FIG. 2b is a scanning electron microscopy image of a part of a tag formed on a green body according to an embodiment of the invention, FIG. 2c is a magnification of the tag shown in FIG. 2b.

DETAILED DESCRIPTION OF EMBODIMENTS OF THE INVENTION

Figure 1:
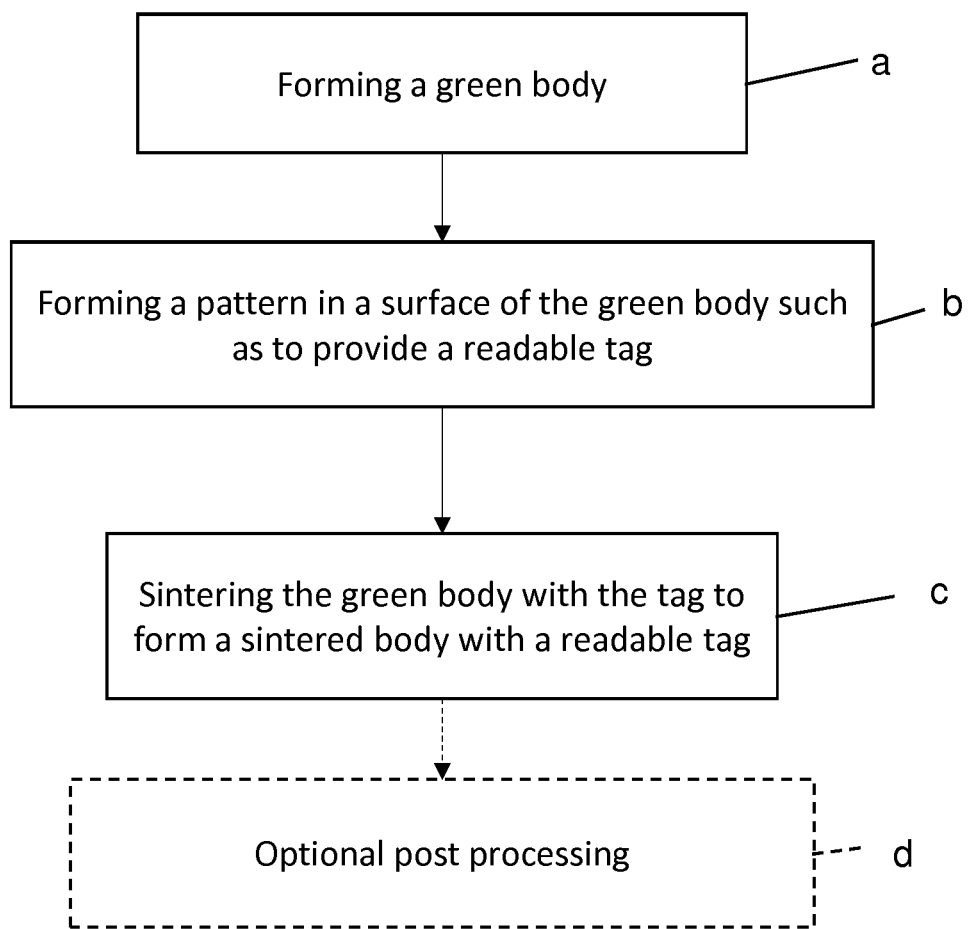
FIG. 1 is a flow chart illustrating a method according to an embodiment of the invention.

A method for manufacturing a sintered body according to an embodiment of the invention is schematically illustrated in the flow chart of FIG. 1. The sintered body is made of, or substantially made of, a material comprising one or more hard constituents in a metallic binder phase. Examples of such materials include cermet, polycrystalline cubic boron nitride and cemented carbide (hard metal). The hard constituents may be tungsten carbide (WC), or another metal carbide with the general composition (Ti, Nb, Ta, W)C, or combinations thereof. The hard constituents may also include metal carbonitrides such as Ti(C, N). The metallic binder phase may be Co, Ni or Fe, or combinations thereof. For example, the material may be a tungsten carbide (WC) based hard metal, or a titanium carbonitride based hard metal. The method comprises the following steps:

(a) Forming a green body from a powder composition comprising at least the one or more hard constituents, the metallic binder phase, and an organic binder system. The green body may be formed using e.g. extrusion, powder injection moulding (PIM), multiaxial or uniaxial pressing, or additive manufacturing. The organic binder systems are selected depending on the method of forming the green body. For example, a method of forming a green body using PIM or extrusion is described in EP1510590, in which the organic binder system consists of poly(ethylene-co-vinylacetate) and a (Polyethylene)-blend-(Poly(oxy-1,2-ethanediyl), .alpha.-hydro.-omega.-hydroxy)-based wax. Another organic binder system for PIM or extrusion comprising olefinic polymers, waxes and petroleum jelly is described in WO2010096003. For multiaxial or uniaxial pressing, e.g. a poly(ethylene glycol) organic binder system may be used.

(b) Forming a pattern in a surface of the green body such as to provide a tag enabling individual identification of the green body, wherein the tag is formed such that it will survive a subsequent sintering process and be readable after sintering. The pattern may preferably be formed using a laser programmed to selectively modify the surface by burning off the organic binder system, thereby forming indentations in the surface of the green body. The tag may be in the form of a data matrix code, consisting of a plurality of first type modules and second type modules of equal module size, each first type module being in level with the surface of the green body surrounding the tag, and each second type module comprising an indentation with respect to the surface of the green body.

(c) Sintering the green body with the tag to form a sintered body having a smaller volume than the green body. The sintering operation is preferably a liquid phase sintering operation, i.e. a sintering operation in which the metallic binder phase melts and solid grains coexist with wetting liquid binder. In the case of cemented carbide, this means solid grains of tungsten carbide (WC) and liquid phase cobalt (Co). The sintering temperature should thus be above a temperature of at least 1250° C. for WC—Co based cemented carbide. The organic binder system is removed in connection with the sintering operation and/or in a separate process step before the sintering operation, such as in a catalytic process, by extraction in a solvent, and/or by thermal debinding at an elevated temperature below the sintering temperature, e.g. at around 500° C.

(d) Optional post processing, e.g. providing a PVD and/or a CVD coating on a surface of the sintered body. The PVD or CVD coating may be provided so that the tag is covered and is sufficiently thin so that the tag is readable also after application of the coating. Post processing may also include grinding of cutting edges on the sintered body, as well as blasting or brushing of the surface of the cutting insert.

EXAMPLES

Example 1

A sintered body in the form of a cemented carbide (WC—Co) exchangeable tool head of a milling tool was produced using a method according to an embodiment of the invention. In step (a), a green body was formed using powder injection moulding with the above described organic binder system comprising olefinic polymers, waxes and petroleum jelly.

Figure 2D:
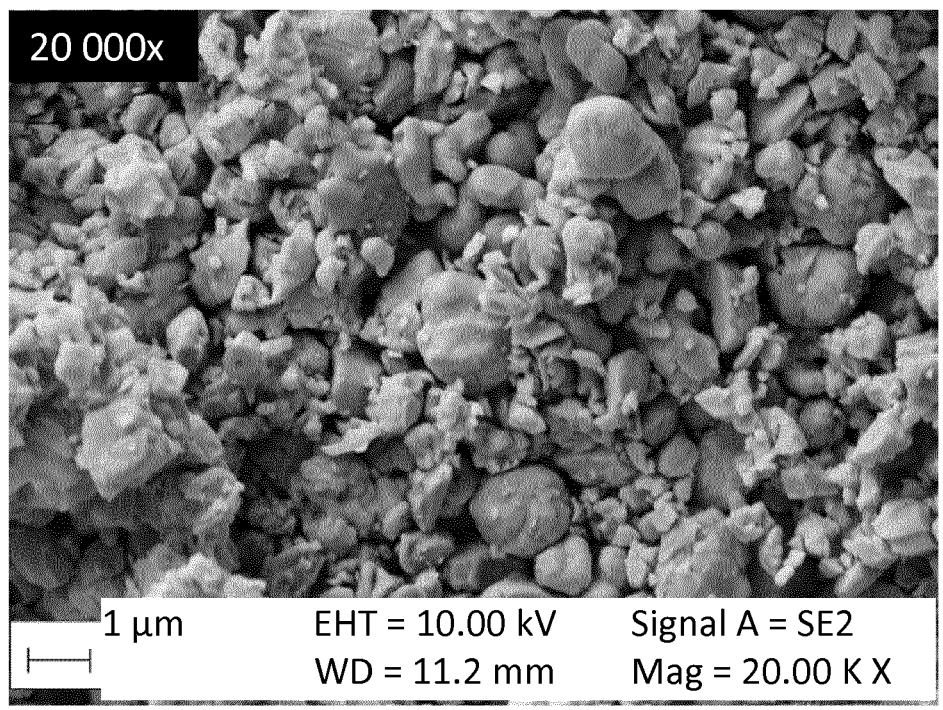
FIG. 2d is a magnification of the tag shown in FIG. 2b.
Figure 5:
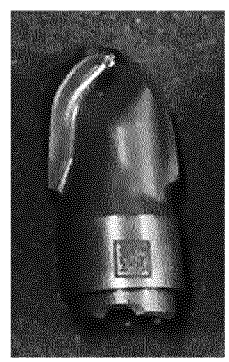

In step (b), a pattern was formed on a surface of the green body to provide a tag in the form of a 12×12 data matrix code formed by a plurality of first type modules and second type modules of equal module size and of an approximately square shape. An example of such a data matrix code is shown in FIG. 2a. The first type modules were here formed by unmodified material in level with the surface of the green body surrounding the tag, and the second type modules were formed by indentations in the surface. The pattern was formed using a laser to selectively burn off the organic binder system and form the indentations. The laser used was a pulsed YAG laser operated with an output power of 20 W at 50 kHz, a pulse length of 250 ns and a marking speed of 3000 mm/s. 4 repetitions was used to create the pattern. Each module had a size of 0.25×0.25 mm². The laser was programmed such that a black and white (B/W) ratio, or a degree of filling, was 75%, i.e. the laser was programmed to create each module with a frame having an area of 5-35% of the total module area, thus adapting an intended size of the indentations so that sufficient contrast would be achieved. The formed tag was found to provide sufficient contrast when read using a handheld Datalogic scanning equipment of model PowerScan PD9530. A series of electron microscopy images of the formed tag at increasing magnification is shown in FIGS. 2b-2d, showing the indentations (dark areas in FIGS. 2b-2c) formed by the laser. FIG. 2c shows a large magnification of an area within one of the indentations. A photography of the green body with the tag formed thereon is shown in FIG. 5.

Figure 3A:
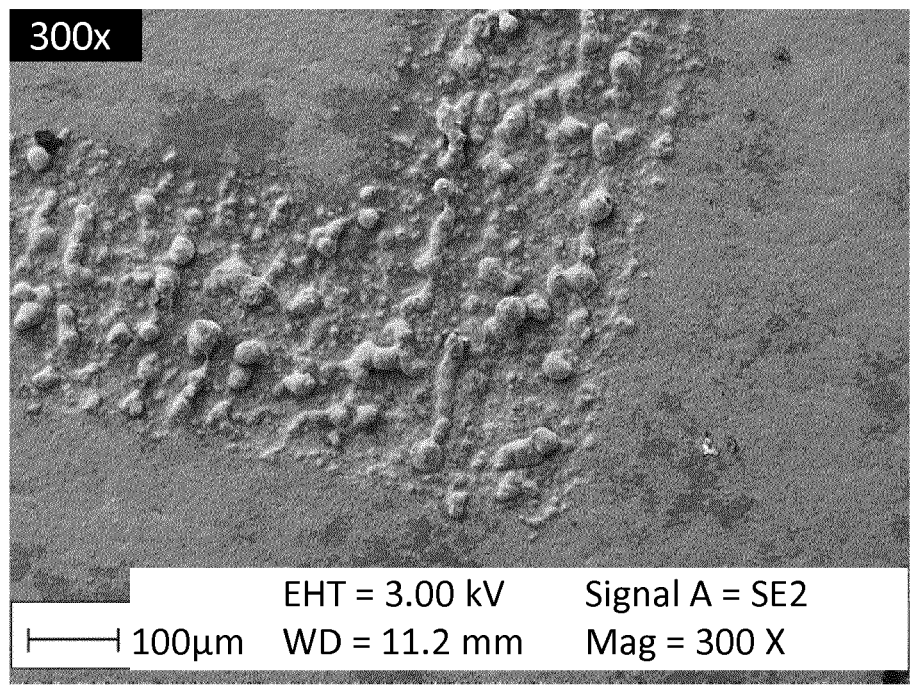
FIG. 3a is a scanning electron microscopy image of a part of the tag in FIG. 2b-2d after sintering.
Figure 3B:
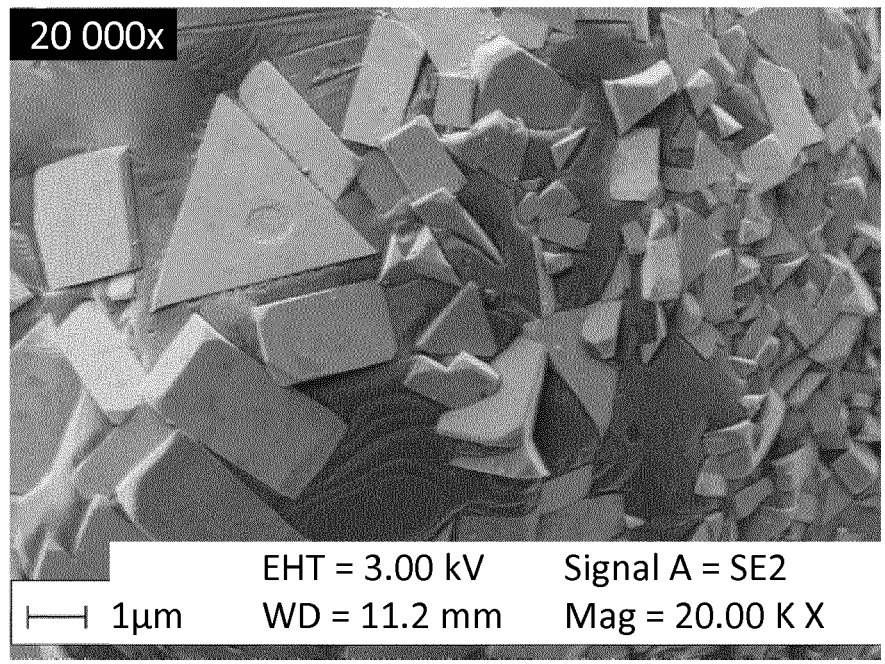
FIG. 3b is a magnification of the tag shown in FIG. 3a, FIG. 4a is a scanning electron microscopy image of a part of the tag in FIG. 3a-3b after applying a CVD coating.

In step (c), the green body with the formed pattern was sintered according to known sintering process parameters at a temperature above the melting temperature of Co, with associated shrinkage. Prior to sintering, debinding was carried out by supercritical carbon dioxide extraction, followed by thermal debinding in connection with the sintering. After sintering, the tag on the resulting sintered body was still readable using the above mentioned scanning equipment. Scanning electron microscopy images of the tag on the sintered body are shown in FIGS. 3a-3b, wherein FIG. 3b shows a large magnification of an area within one of the indentations.

Figure 4A:
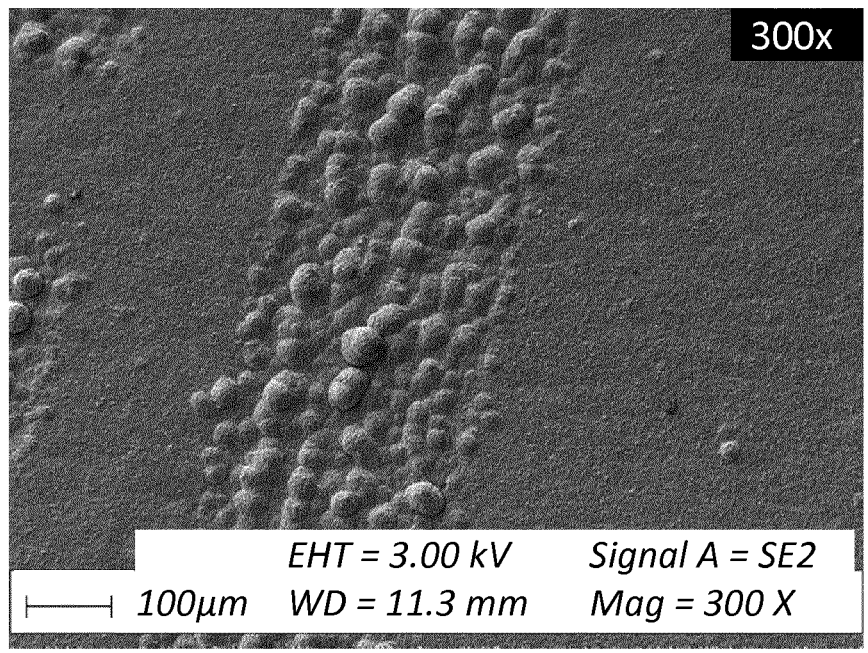
FIG. 4b is a magnification of the tag shown in FIG. 4a, FIG. 5 shows a green body according to an embodiment of the invention.
Figure 4B:
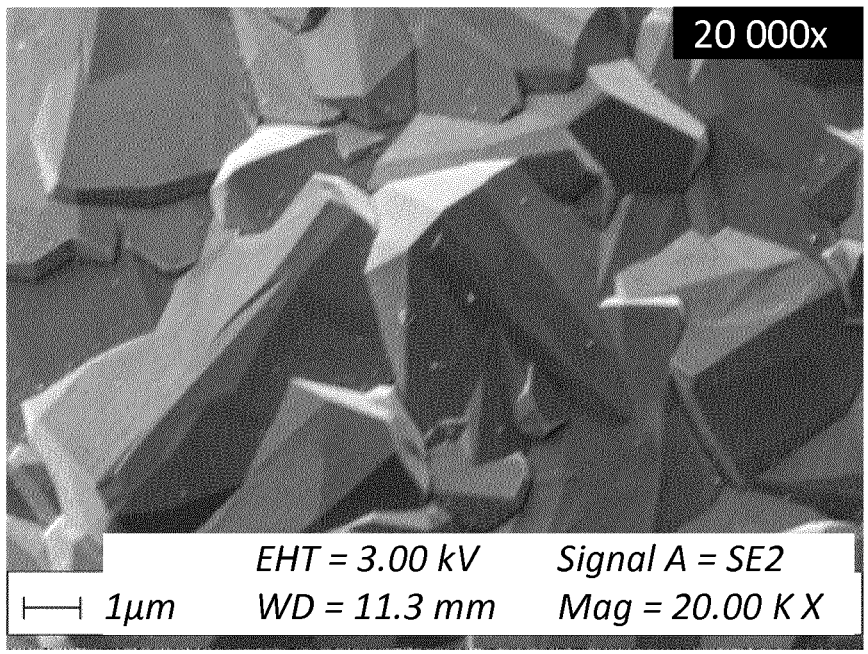

In step (d) a CVD coating with a thickness of about 10 μm was applied on the sintered body. FIGS. 4a-b show scanning electron microscopy images of the tag after application of the coating, wherein FIG. 4b shows a large magnification of an area within one of the indentations. The tag was still readable after application of the coating.

Example 2

A sintered body in the form of a cemented carbide (WC—Co) indexable cutting insert was produced using a method according to an embodiment of the invention. In step (a), a green body was formed using direct pressing, with a poly(ethylene glycol) organic binder system.

In step (b), a pattern was formed on a surface of the green body to provide a tag as described in Example 1. The pulse length was 100 ns, the marking speed 500 mm/s, the power 20 W and the frequency 50 kHz. The pattern was formed using a single repetition with a B/W ratio of 95%. The formed tag was readable after creation using the same scanning equipment as in Example 1.

Figure 6:
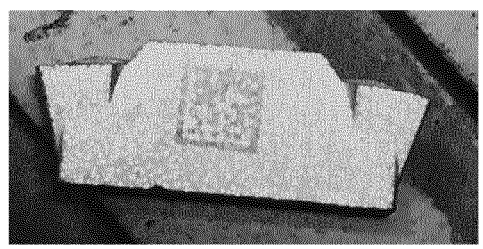
FIG. 6 shows a sintered body according to an embodiment of the invention.

In step (c), the green body was sintered using known sintering process parameters, with thermal debinding in connection with the sintering process. The tag was readable also after sintering. FIG. 6 shows a photography of the sintered cutting insert with the tag formed thereon.

In step (d), a CVD coating was applied. The tag was still readable after application of the coating.

Example 3

A sintered body in the form of a cemented carbide (WC—Co) exchangeable tool head of a milling tool was produced using a method according to an embodiment of the invention. In step (a), a green body was formed using powder injection moulding with the above described organic binder system comprising poly(ethylene-co-vinylacetate) and a (Polyethylene)-blend-(Poly(oxy-1,2-ethanediyl), .alpha.-hydro.-omega.-hydroxy)-based wax.

In step (b), a pattern was formed on a surface of the green body to provide a tag as described in Example 1. The pulse length was 100 ns, the marking speed 500 mm/s, the power 20 W and the frequency 50 kHz. The pattern was formed using two repetitions with a B/W ratio of 75%. The formed tag was readable after creation using the same scanning equipment as in Example 1.

In step (c), the green body was sintered using known sintering process parameters, with thermal debinding in connection with the sintering process. The tag was readable also after sintering.

In step (d), a CVD coating was applied. The tag was still readable after application of the coating.

In all the examples, the parameters used when creating the pattern may be varied. In step (a), the laser frequency may e.g. be varied within a range of 50-200 kHz, 1-6 repetitions may be used to create the pattern and the marking speed may e.g. be 500-3000 mm/s. The B/W ratio may e.g. be 65-95%. More than one pulse may preferably be used to form each module, such as at least 2×2 pulses or 3×3 pulses per module.

The invention is of course not limited to the embodiments disclosed, but may be varied and modified within the scope of the following claims.

The invention claimed is:

1. A method for manufacturing a sintered body having one or more hard constituents in a form of a metal carbide with the general composition (Ti, Nb, Ta, W)C or combinations thereof, or in form of metal carbonitrides, in a metallic binder phase, the method comprising:
   forming a green body from a powder composition including at least the one or more hard constituents, the metallic binder phase, and an organic binder system;
   forming a pattern in a surface of the green body to provide a tag enabling individual identification of the green body, wherein forming the pattern comprises using a laser to selectively burn off the organic binder system with a marking speed of 500-3000 mm/s, thereby forming indentations in the surface; and
   sintering the green body with the tag to form a sintered body having a smaller volume than the green body, wherein the pattern is formed such that the tag is readable after the sintering operation.

2. The method according to claim 1, wherein the tag is in the form of a data matrix code.

3. The method according to claim 1, wherein the tag includes a plurality of first modules and a plurality of second modules, the first and second modules being of equal module size, each of the plurality of first modules being level with a surface of the green body surrounding the tag, and each of the plurality of second modules including an indentation with respect to said surface, and wherein forming the pattern includes selectively forming the indentations.

4. The method according to claim 3, wherein forming the pattern includes adapting an intended size of the indentations such that, after sintering of the green body, a contrast is achieved between neighbouring first and second modules.

5. The method according to claim 4, wherein adapting the intended size includes setting the intended size to a smaller value than the module size.

6. The method according to claim 1, further comprising storing and retrieving data relating to the manufacturing of the sintered body in a central database.

7. The method according to claim 1, further comprising post-sintering processing of the sintered body, wherein the pattern is formed such that the tag is readable after the post-sintering processing.

* * * * *